Dec. 19, 1961  N. G. MALONEY, JR  3,013,429
BROKEN FILAMENT DETECTOR
Filed Oct. 13, 1958  2 Sheets-Sheet 1
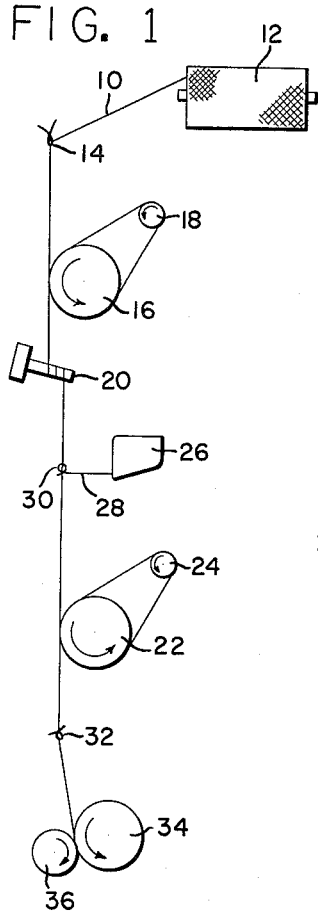
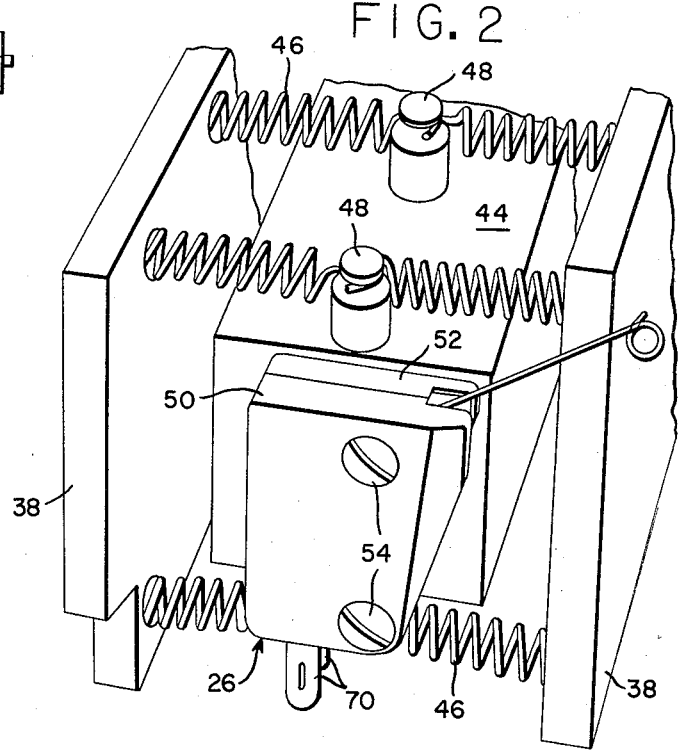
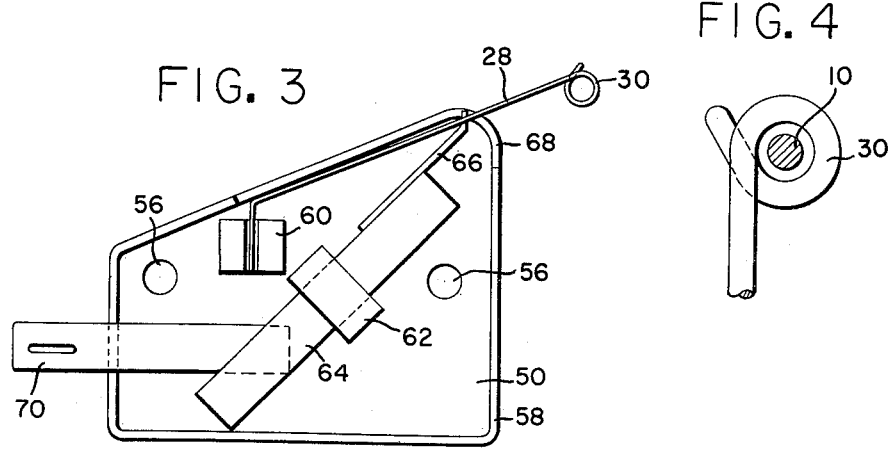

Dec. 19, 1961  N. G. MALONEY, JR  3,013,429
BROKEN FILAMENT DETECTOR
Filed Oct. 13, 1958  2 Sheets-Sheet 2

United States Patent Office 3,013,429
Patented Dec. 19, 1961

3,013,429
BROKEN FILAMENT DETECTOR
Norvin G. Maloney, Jr., Wilmington, Del., assignor to E. I. du Pont de Nemours and Company, Wilmington, Del., a corporation of Delaware
Filed Oct. 13, 1958, Ser. No. 766,834
12 Claims. (Cl. 73—160)

This invention relates, generally, to the production and handling of filamentary structures and, more particularly, to the detection of broken filaments and like defects in a running yarn.

The most important object of the present invention is the provision of a defect detection probe adapted for inclusion in a yarn-processing installation.

Another object of the invention is to provide a defect detection probe which will not interrupt the continuous processing of normal or acceptable yarn.

A further object of this invention is the provision of apparatus including a vibratile detection probe, a transducer and circuitry, which apparatus is adapted to monitor automatically the number, rate and amplitude of filament defects in a continuous yarn-handling process.

With these and other objects in view, the monitoring apparatus of the present invention comprises, generally, a vibratile probe having a loop along its length in close proximity to a running yarn bundle, transducer means mounting the probe, and analysis circuitry coupled with the transducer means for accomplishing desired functions such as stopping the process if the amplitude or rate of defects is excessive and counting the total number of defects. Additional features will be apparent from the description which follows, reference being had to the accompanying drawings, wherein:

FIGURE 1 is a schematic representation of a yarn-drawing installation having the monitoring apparatus of the present invention incorporated therein;

FIG. 2 is a fragmentary, perspective view of a mount for the transducer means and the detection probe;

FIG. 3 shows the interior of the casing in which the probe and transducer are mounted, one section of the casing having been removed;

FIG. 4 is an enlarged view of the probe loop shown in FIGS. 2 and 3;

Figure 5:
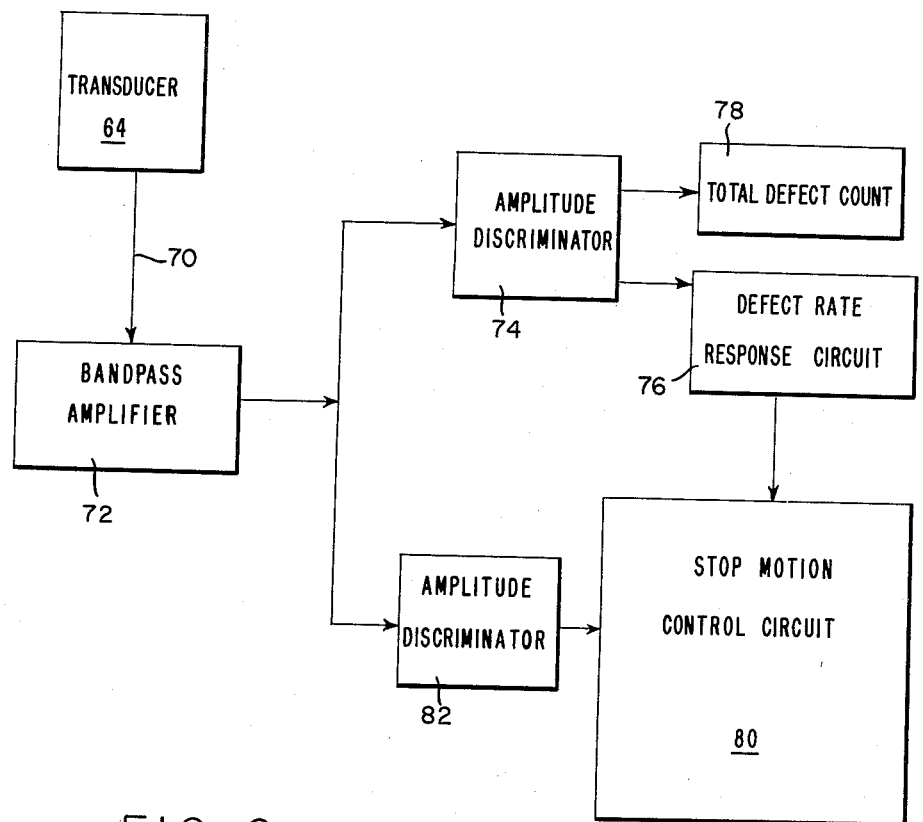
FIG. 5 is a block diagram of the analysis circuitry employed in the apparatus of the invention.

Commercial production of synthetic linear polymeric yarns, filaments, and the like customarily involves "drawing" the filaments to an increased length, thereby producing a more tenacious structure having characteristic X-ray diffraction patterns indicative of internal orientation along the filament axis. Drawing may be carried out at any temperature below the softening point of the polymer, hence the process is often termed "cold drawing." This operation is carried out on most melt-spun and other thermoplastic materials. The apparatus of the present invention is described below in connection with a typical drawing operation.

The breaking strength or tenacity of a synthetic filament depends upon the degree of orientation of the polymer molecules along the axis of the filament, all other factors such as molecular weight, polymer composition, etc., being the same. The degree of orientation of the molecules depends in turn upon the extent of drawing, or more specifically upon the "draw ratio" (the ratio of a certain length of filament after drawing to the length of the same mass of material before drawing). For many uses, especially in tire cords and industrial applications, high tenacity is desired and hence the achievement of a high draw ratio becomes an important consideration.

However, the total draw ratio is limited by various practical considerations such as the number and frequency of occurrence of broken filaments in the running yarn bundle. Such breaks occur to an undesirable extent at excessive draw ratios, or, in the case where the draw ratio is optimum, broken filaments may be caused by worn guides or draw pins, off-standard spinning conditions, poor polymer quality, inadequate finish application, etc. A defect count is an accurate indication of such difficulties and the continuous in-process measurement thereof is, accordingly, of considerable value as a quality and process control.

Known devices for detecting broken filaments and similar defects are expensive and elaborate, as well as difficult to control and maintain, and their use is limited by numerous physical considerations. Such instruments are best suited for laboratory use, wherein yarn is merely sampled from commercial production and, subsequently spun to waste.

Referring now to the representative drawing installation shown in FIG. 1, a single end of undrawn yarn 10 is withdrawn from package 12, passes through the pigtail guide 14, and is then passed in multiple wraps about driven feed roll 16 and its associated canted separator roll 18. Of course, yarn could be supplied to guide 14 directly from a coupled spinning machine rather than from the package 12. From feed roll 16, the undrawn yarn 10 makes one or more wraps about a snubbing pin 20 and is drawn in frictional contact therewith, under the urging of draw roll 22 and its associated canted separator roll 24. Draw roll 22 has a higher peripheral speed than feed roll 16, whence the yarn is elongated to several times its original or undrawn length. Intermediate pin 20 and draw roll 22, there is positioned a defect detector 26 comprising a probe 28 terminating in a loop 30 through which yarn 10 is threaded. Downstream from draw roll 22, the yarn passes guide 32 and is traversed onto package 34 by drive roll 36. Alternatively, the yarn may be forwarded from guide 32 to a spindle-driven, ring-traveler windup for twisting.

In FIG. 2, a means for mounting the detector 26 has been illustrated. The supports 38 may be positioned in a convenient location on the framework of the installation shown schematically in FIG. 1. Between the supports 38, a mounting block 44 is suspended by coil springs 46, each of which extends between a support 38 and a pin 48.

In FIG. 2, it is seen that detector 26 has a casing including sections 50 and 52. Fasteners 54 extend through apertures 56 (FIG. 3) to join the detector 26 to block 44. As shown in FIG. 3, each casing section 50, 52 has a lip 58 so that, when the sections are joined, the casing is hollow. On each of the sections, there is positioned a steel block 60 having a groove therein. A rubber ring 62 surrounds a ceramic crystal transducer 64 and is bonded to section 50. Crystal 64 has a steel pin 66 integral therewith and projecting upwardly into a slot 68. A terminal conductor bar 70 is bonded to each section of the casing. When the detector casing is assembled, probe 28 has its lower end situated in the grooves of the two blocks 60 and is anchored in place thereby, with the loop 30 spaced from the casing; ring 62 engages both sections 50, 52 and thus serves as a cushion mounting which isolates crystal 64; and pin 66 extends outwardly into engagement with probe 28. In this embodiment, the probe 28 thus constitutes a cantilever mechanical resonator.

In operation, the broken filament detector 26, which is a component of the disclosed monitoring apparatus, is positioned so that yarn 10 passes through the loop 30 of the probe without contacting the same. However, since broken filaments usually form fluff balls and the like, they will contact the loop 30 and cause the probe to vibrate. The magnitude of the vibration depends on several factors: the mass and speed of the contacting filament, the stiffness of the probe, the length of the probe, etc. Since the probe engages steel pin 66 and is therefore mechanically coupled to the transducer, the vibration of the probe is converted into an electrical signal, the magnitude of which depends on the nature of the transducer.

The block diagram of FIG. 5 shows that the signals emanating from transducer 64 pass, through conductors 70, to an amplifier 72 which includes several amplification stages. A gain control at the output of the first stage can be used to vary the sensitivity of the apparatus. Interstage filters may also be used to remove extraneous components from the signal, thus further reducing the effects of ambient vibrations. A first discriminator 74 receives the amplified signals and passes the same to a rate response circuit 76 and to a counter 78. Should the defect rate or frequency become excessive, circuit 76 is triggered to energize a stop-motion control circuit 80 which is so connected as to disable rolls 16, 22 and 36 when energized. Since a broken filament often "strips back" at the loop of the probe, a time delay circuit may be employed in combination with discriminator 74 so that multiple counts do not result from a single broken filament. A time delay between counts of as much as one second is usually satisfactory, since broken filaments very rarely occur at a greater frequency. A second discriminator 82 passes only those signals of relatively large amplitude. Since circuit 82 is also coupled with control circuit 80, a yarn defect of sufficient magnitude will also cause the position to be shut down. Typical causes of such relatively large defects are a worn or abraded draw pin, worn guides, inadequate finish application, a clogged spinneret, poor quality polymer, and the like.

The circuits 72, 74, 76, 78 and 82, along with detector 26, comprise the monitoring apparatus of the present invention.

The probe 28 is usually formed from wire, and should possess sufficient rigidity that an adequate signal will result from contact with a broken or defective filament. The length and stiffness of the probe should be such that vibrations therein are readily damped, i.e., so that the probe recovers rapidly to the non-vibrating or undisturbed state. A suitable probe wire is composed of steel, and has a diameter of from 10 to 50 mils. The loop diameter is usually about ⅛ inch for use with textile yarn. Generally, the ratio of the loop diameter to the effective yarn diameter should be from about 5 to 100, and preferably is about 10 to 50. Where the ratio is too low, an excessive number of extraneous vibrations are detected, due mainly to fluctuations in the yarn line. Where the ratio is too high, many defects may pass undetected through the loop. When a loop conforming to the above ratios is employed, 80% or more broken filaments, or defects which derive therefrom, such as fluffs or loops, are detected and may be counted and/or recorded.

Figure 6:
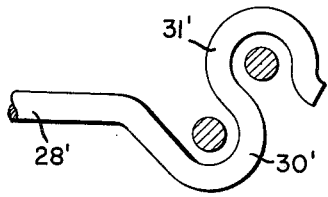
FIG. 6 is an enlarged, fragmentary view of a probe modification.

A modification of the probe is shown in FIG. 6, which modification is adapted for use in monitoring a double-end process. Probe 28' has a pair of open loops 30' and 31' formed intermediate its ends, both of which are self-stringing. The probe, thus modified, is adapted for use in either a single- or double-end operation.

The rubber ring 62 serves as a shock mount for crystal 64 and minimizes extraneous vibrations from the associated machinery and from other plant operations. To further reduce such extraneous vibrations, the detector 26 has been shock mounted by springs 46, as shown in FIG. 2. The latter shock mounting may be omitted, if desired, since it is not essential to the satisfactory performance of the monitoring apparatus. An added factor in the elimination of extraneous vibrations is that the probe 28 is made of a steel alloy which, for the dimensions involved, has a natural frequency of vibration in the order of 200 cycles per second which is high compared to the vibration frequencies present in an installation of the type described. Such extraneous vibrations are therefore not effective in exciting vibrations in the probe.

The disclosed monitoring apparatus may be used to advantage during the drawing operation; however, it may also be employed with comparable benefit during many other textile operations, such as spinning, twisting, coning, rewinding, beaming, and the like. When used in a coupled spin-draw operation, it provides a check point on spinning and polymer conditions. Practice of this invention is most useful in monitoring continuous multifilament yarn; however, other filamentary structures, such as thread, spun yarn, multistrand wire, etc., may be monitored with suitable modification of the detector.

I claim:

1. In a yarn-handling installation including a source of yarn, guide means for stabilizing a moving yarn bundle, and driven means for withdrawing the bundle from the source and through the guide means, an apparatus for the automatic in-process monitoring of defective yarn filaments, said apparatus also being included in said installation and comprising: a support; an elongated flexible detection probe fixedly attached at a first point in the length thereof to said support and extending outwardly therefrom as a cantilever, said probe passing at a second point in its length in close proximity to but spaced from said moving bundle; a signal-generating transducer fixedly attached to said support and coupled mechanically with said probe for converting movement imparted to the probe by defects protruding from the bundle into usable electric signals, and circuit means interconnecting the transducer means and the driven means for disabling the latter as signals are generated.

2. The installation of claim 1 wherein said circuit means includes a first discriminator circuit responsive only to defect amplitude and a second discriminator circuit responsive only to defect rate.

3. The installation of claim 2 wherein is provided a defect counter coupled to said second circuit.

4. The installation of claim 1 wherein said detection probe is a vibratile wire bent at said one point into a configuration complemental to but spaced from said yarn bundle.

5. The installation of claim 4 wherein said vibratile wire is bent at a second point in its length into a configuration complemental to a yarn bundle whereby to adapt the apparatus for monitoring two bundles simultaneously.

6. The installation of claim 4 wherein said complemental configuration is a loop formed in said wire adjacent one end thereof.

7. The installation of claim 1 wherein said probe is a vibratile wire having a natural frequency of vibration in the order of 200 cycles per second.

8. An apparatus for detecting defects in a moving filamentary structure, said apparatus comprising: a support; an elongated vibratile element fixedly attached at a first point in the length thereof to said support and extending outwardly therefrom as a cantilever, said element passing at a second point in its length in close proximity to but spaced from said structure and being subject to vibration when contacted by defects protruding from the moving structure; and a signal-generating transducer, said transducer being fixedly attached to said support and coupled mechanically with said element for converting its vibratory movement into usable electric signals.

9. An apparatus for detecting defects in moving filamentary structures, said apparatus comprising: a support; an elongated vibratile element fixedly attached at a first point in the length thereof to said support and extending outwardly therefrom as a cantilever, said element passing at one or more other points in its length in close proximity to but spaced from a filamentary structure, said element being subject to vibration when contacted by defects protruding from said moving structure; and a signal-generating transducer, said transducer being fixedly attached to said support and coupled mechanically with said element for converting its vibratory movement into usable electric signals.

10. An apparatus as set forth in claim 9, said element being bent upon itself at said one or more other points into a configuration complemental to, spaced from and at least partially surrounding said structure.

11. An apparatus for the in-process monitoring of defective yarn filaments, said apparatus comprising: an elongated vibratile cantilever mounted probe and a transducer means for converting vibratory movements of the probe into usable electric signals, said probe having a yarn-receiving loop at one end thereof and being fixedly mounted at its opposite end on said transducer means, said loop being adapted for positioning in surrounding but spaced relationship to a bundle of said filaments.

12. An apparatus as set forth in claim 11 wherein a defect counter is coupled with the transducer means.

References Cited in the file of this patent

UNITED STATES PATENTS

| | | |
|---|---|---|
| 1,632,591 | Dennis | June 14, 1927 |
| 2,231,537 | Keeler | Feb. 11, 1941 |
| 2,242,889 | Keeler | May 20, 1941 |
| 2,302,081 | Weitmann | Nov. 17, 1942 |
| 2,524,579 | Taylor | Oct. 3, 1950 |
| 2,826,911 | Hartford et al. | Mar. 18, 1958 |